US 12,122,346 B2

(12) United States Patent
Kim et al.

(10) Patent No.: US 12,122,346 B2
(45) Date of Patent: Oct. 22, 2024

(54) METHOD FOR OPERATING BRAKE REDUNDANCY DEVICE

(71) Applicants: HYUNDAI MOTOR COMPANY, Seoul (KR); KIA CORPORATION, Seoul (KR)

(72) Inventors: Yong Yeon Kim, Bucheon-si (KR); Joo Beom Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 318 days.

(21) Appl. No.: 17/724,303

(22) Filed: Apr. 19, 2022

(65) Prior Publication Data

US 2023/0174034 A1 Jun. 8, 2023

(30) Foreign Application Priority Data

Dec. 2, 2021 (KR) .................... 10-2021-0171078

(51) Int. Cl.
*B60T 8/88* (2006.01)
*B60T 8/94* (2006.01)
*B60T 13/68* (2006.01)

(52) U.S. Cl.
CPC ............ *B60T 8/885* (2013.01); *B60T 8/94* (2013.01); *B60T 13/686* (2013.01);
(Continued)

(58) Field of Classification Search
CPC .......... B60T 8/885; B60T 8/94; B60T 13/686; B60T 2270/402; B60T 2270/413;
(Continued)

(56) References Cited

U.S. PATENT DOCUMENTS

2020/0023823 A1 * 1/2020 Baehrle-Miller ....... B60T 8/321
2021/0078556 A1 * 3/2021 Laine .................... B60T 13/683
(Continued)

FOREIGN PATENT DOCUMENTS

KR    20190016796 A  *  2/2019  ............ B60T 13/148

OTHER PUBLICATIONS

English translation of Kim et al. (KR-20190016796) (Year: 2019).*

*Primary Examiner* — James M McPherson
*Assistant Examiner* — Kyle J Kingsland
(74) *Attorney, Agent, or Firm* — MORGAN, LEWIS & BOCKIUS LLP

(57) ABSTRACT

A method of operating a brake redundancy device including a main braking controller and a backup braking controller, includes: confirming whether or not a command signal for deceleration of the vehicle has been received, by the backup braking controller; executing a front-wheel braking mode by the backup braking controller when the command signal has been received; determining whether or not an allowable condition for providing the hydraulic pressure to wheel cylinders of rear wheels has been satisfied; and executing a rear-wheel braking mode through a cooperative control of the main braking controller and the backup braking controller when the allowable condition has been satisfied, wherein in the executing of the rear-wheel braking mode, the hydraulic pressure is provided from the backup braking controller to a portion of the main braking controller.

16 Claims, 7 Drawing Sheets

(52) U.S. Cl.
CPC ... *B60T 2270/402* (2013.01); *B60T 2270/413* (2013.01); *B60T 2270/88* (2013.01)

(58) Field of Classification Search
CPC .. B60T 2270/88; B60T 8/1755; B60T 8/4081; B60T 13/146; B60T 13/662; B60T 13/745; B60T 17/22; B60T 8/321; B60T 13/58; B60Y 2306/15
See application file for complete search history.

(56) References Cited

U.S. PATENT DOCUMENTS

| | | | | |
|---|---|---|---|---|
| 2021/0146900 | A1* | 5/2021 | Einig | B60T 13/662 |
| 2021/0300392 | A1* | 9/2021 | Shionome | G07C 5/0816 |
| 2022/0281427 | A1* | 9/2022 | Marquart | B60T 13/662 |

* cited by examiner

METHOD FOR OPERATING BRAKE REDUNDANCY DEVICE

CROSS-REFERENCE TO RELATED APPLICATION(S)

This application claims the benefit of priority to Korean Patent Application No. 10-2021-0171078 filed on Dec. 2, 2021 in the Korean Intellectual Property Office, the disclosure of which is incorporated herein by reference in its entirety.

TECHNICAL FIELD

The present disclosure relates to a method of operating a brake redundancy device capable of improving noise, vibration and harshness (NVH) reduction performance and behavioral stability of a vehicle in a redundancy situation.

BACKGROUND

In general, an autonomous vehicle refers to a vehicle capable of autonomously driving to a set destination by monitoring external information and determining a driving situation by itself without the manipulation of a driver. While the autonomous vehicle is driving, an autonomous driving mode and a driver mode may be switched. The mode switching is a point in time at which driving control rights are transferred.

For example, when a serious malfunction occurs in a brake or a controller thereof, it is dangerous for the vehicle to continuously autonomously drive without a clear decision about a driving situation, and thus, an autonomous driving system of the vehicle may generate an alarm and request the driver to switch driving control rights.

Even in the case that the autonomous driving system of the vehicle requests the driver to switch driving control rights as described above, there may be a case in which the driver does not respond to such a request or may not immediately react to such a request. In this case, since the autonomous driving system is responsible for the safety of the vehicle before the complete switching of driving control rights, the autonomous driving system of the vehicle may perform a minimum risk maneuver in which a deceleration pattern is applied differently according to a driving environment of the vehicle. The minimum risk maneuver needs to be capable of decelerating the vehicle in an appropriate route.

To this end, Korean Patent Publication No. 1969892 has suggested a technology of combining an integrated electric booster (IEB) and an electronic parking brake (EPB) linked to an electronic stability control (ESC) with each other.

However, such a technology has a disadvantage that a redundancy hydraulic circuit may brake only front wheels, and a system becomes complicated and costs increase in order to change front-wheel braking to four-wheel or all-wheel braking, advantageous for vehicle stability control. Moreover, rear wheels may be rapidly braked by applying an electric signal to the EPB acting as a braking unit in an emergency, but the EPB has a problem that impact and noise are very high at the time of operation and release of the EPB and precise control is impossible due to low linearity, as compared to hydraulic pressure.

The above descriptions regarding background technologies have been made only for enhancement of understanding of the background of the present disclosure, and are not to be deemed by those skilled in the art to correspond to already-know prior arts, and should not be taken as acknowledgment that this information forms any part of prior art.

SUMMARY

An aspect of the present disclosure is to provide a method of operating a brake redundancy device capable of improving noise, vibration and harshness (NVH) reduction performance and behavioral stability of a vehicle in a redundancy situation.

According to an aspect of the present disclosure, a method of operating a brake redundancy device including a main braking controller performing braking by providing a hydraulic pressure to wheel cylinders mounted on a plurality of wheels of a vehicle and a backup braking controller performing braking on behalf of the main braking controller in a redundancy situation, may include: confirming whether or not a command signal for deceleration of the vehicle has been received, by the backup braking controller; executing a front-wheel braking mode by the backup braking controller when the command signal has been received; determining whether or not an allowable condition for providing the hydraulic pressure to wheel cylinders of rear wheels has been satisfied; and executing a rear-wheel braking mode through cooperative control of the main braking controller and the backup braking controller when the allowable condition has been satisfied, wherein in the executing of the rear-wheel braking mode, the hydraulic pressure is provided from the backup braking controller to a portion of the main braking controller.

The method may further include a failure determining step of monitoring and determining failures of components by each of the main braking controller and the backup braking controller.

The failure determining step may include: monitoring and determining a failure of a hydraulic pressure supply unit by the main braking controller; transmitting a failure signal to the backup braking controller when it is determined that the failure of the hydraulic pressure supply unit has occurred; confirming whether or not the failure signal of the hydraulic pressure supply unit has been received from the main braking controller by the backup braking controller; determining a failure of the backup braking controller when the failure signal of the hydraulic pressure supply unit has been received; and entering into the cooperative control of the main braking controller and the backup braking controller when there is no failure of the backup braking controller.

The failure determining step may further include, before the monitoring and determining of the failure of the hydraulic pressure supply unit, monitoring and determining failures of components other than the hydraulic pressure supply unit by the main braking controller, and when there are no failures of the components other than the hydraulic pressure supply unit, the monitoring and determining of the failure of the hydraulic pressure supply unit may be performed.

The failure determining step may further include, before the confirming whether or not the failure signal of the hydraulic pressure supply unit has been received, determining whether or not a failure of communication has occurred, by the backup braking controller.

In the determining of the failure of the backup braking controller, when it is determined that a failure of at least one of the components of the backup braking controller has occurred, the method may end.

The allowable condition may include a condition in which a value of a hydraulic pressure sensed by a third pressure sensor of the backup braking controller is equal to a predetermined reference value or more, or a condition in which an amount of required longitudinal deceleration/acceleration of the vehicle calculated by an autonomous driving controller of the vehicle is equal to a predetermined reference value or more.

The executing of the rear-wheel braking mode may include: opening a flow passage between the backup braking controller and the main braking controller; and transmitting operation information of the backup braking controller to the main braking controller.

The executing of the rear-wheel braking mode may include: confirming whether or not the rear-wheel braking mode has been executed through the cooperative control, by the main braking controller; operating a valve for the cooperative control of the main braking controller when it is determined that the rear-wheel braking mode is being executed; and transmitting operation information of the main braking controller to the backup braking controller.

In the confirming whether or not the rear-wheel braking mode has been executed, it may be determined that the rear-wheel braking mode is being executed based on the operation information received from the backup braking controller.

In the operating of the valve, a balancing valve between a first hydraulic pressure supply line on a rear wheel side and a second hydraulic pressure supply line on a front wheel side may be switched to an opened state, and in a state in which braking of front wheels is maintained, a hydraulic pressure input from the backup braking controller may be supplied from the second hydraulic pressure supply line of the main braking controller to the first hydraulic pressure supply line.

The method may further include executing a selective braking mode of imparting a difference in braking force between left and right rear wheels through the cooperative control of the main braking controller and the backup braking controller for vehicle stability control.

The selective braking mode may include: determining whether or not the selective braking mode is required; determining whether or not a dump for dumping the hydraulic pressure is required when it is determined that the selective braking mode is required; and executing the selective braking mode through the cooperative control of the main braking controller and the backup braking controller when the dump is required.

In the determining whether or not the dump for dumping the hydraulic pressure is required, when the dump is not required, a hold state of constantly holding the hydraulic pressure may be executed, such that the front-wheel braking mode and the rear-wheel braking mode are maintained.

The executing the selective braking mode may include: confirming whether or not the selective braking mode has been executed through the cooperative control, by the main braking controller; operating a valve for the cooperative control of the main braking controller when it is determined that the selective braking mode is being executed; and transmitting operation information of the main braking controller to the backup braking controller.

In the confirming whether or not the selective braking mode has been executed, it may be determined that the selective braking mode is being executed based on dump request information received from the backup braking controller.

In the operating of the valve, a wheel inlet valve on any one of first and second hydraulic pressure branch lines connected to wheel cylinders of wheels for which the dump is required in a first hydraulic pressure supply line on a rear wheel side may be switched to a closed state, and a wheel outlet valve on any one of the first and second hydraulic pressure branch lines may be switched to an opened state, and in a state in which braking of a front wheel and braking of the other rear wheel are maintained, hydraulic oil existing in any one hydraulic pressure branch line may be transferred to a reservoir through the wheel outlet valve.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
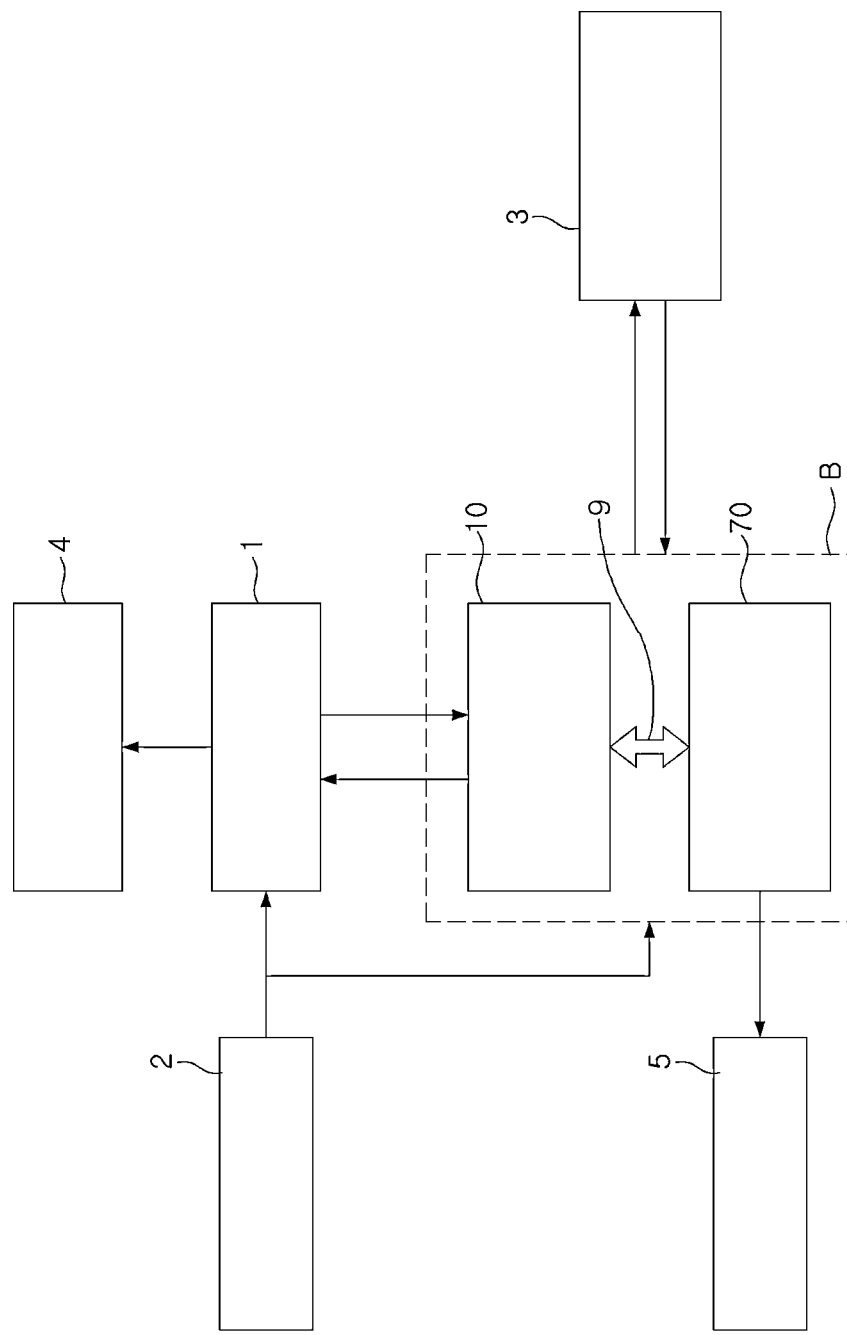
FIG. 1 is a schematic block diagram illustrating an autonomous driving system to which a brake redundancy device is applied.

Hereinafter, the present disclosure will be described in detail with reference to the accompanying drawings. It is to be noted that in giving reference numerals to components of the respective drawings, the same components will be denoted by the same reference numerals even though they are illustrated in different drawings.

In the present specification, the terms such as "first", "second", and "third" may be used to describe various components, but these components are not limited in order or size, position, and importance by these terms, and these terms are used only to distinguish one component from another component.

In addition, a four-wheel vehicle is described and illustrated by way of example for convenience of explanation in the present specification, but the present disclosure is not necessarily limited thereto. For example, the present disclosure may be applied to a vehicle with two or more wheels.

In addition, in the present specification, a vehicle refers to various vehicles that move a transported object such as a person, an animal, or an object from a departure point to a destination. Such vehicles are not limited to vehicles traveling on roads or tracks.

A level of autonomous driving may vary depending on a condition. For example, a level classified by the Society of Automotive Engineers (SAE) International is in common use, and is divided into six levels from 'level 0' to 'level 5'.

In level 0, a driver needs to completely control the vehicle, and in level 1, a system of the vehicle may perform lane following assist (LFA), smart cruise control, and the like, for either steering or deceleration/acceleration in a specific driving mode.

Highway driving assist (HDA) in which the system of the vehicle performs both steering and deceleration/acceleration in a specific driving mode corresponds to level 2.

In level 3, the system of the vehicle performs driving in a specific mode such as highway driving pilot (HDP). The vehicle may change lanes by oneself and overtake a preceding vehicle or avoid obstacles.

Level 4 is the same as level 3 in that the system of the vehicle performs the entire driving, but may safely cope with the occurrence of a dangerous situation. Furthermore, level 4 has a restriction on a zone where driving may be performed, while level 5 does not have such a restriction.

In Level 3, when a dangerous situation occurs if the autonomous driving system of the vehicle continuously operates, a method capable of predicting and appropriately coping with such a situation needs to be prepared.

For example, when autonomous driving of the vehicle becomes impossible, the autonomous driving system may generate a request to the driver for switching of a driving control right, but the driver may not respond to or may not immediately cope with such a request.

In this case, the autonomous driving system of the vehicle may perform a minimum risk maneuver based on a driving environment of the vehicle in order to protect the driver and the vehicle and prevent an accident with a surrounding vehicle, and may exhibit a subsequent safety securing function according to the minimum risk maneuver.

The autonomous driving system of the vehicle needs to be able to decelerate and stop the vehicle within an appropriate route in response to the minimum risk maneuver.

FIG. 1 is a schematic block diagram illustrating an autonomous driving system to which a brake redundancy device is applied.

The autonomous driving system illustrated in FIG. 1 may include an autonomous driving controller 1, a main braking controller 10, a backup braking controller 70, a sensor system 2, and a vehicle controller 3 (e.g., a VCU). Respective components may be modularized and separated.

Each of the controllers 1, 10, and 70 may include a separately mounted electronic controller (ECU), and a control function and a communication function of the controllers 1, 10, and 70 may be performed by the ECU. However, the present disclosure is not necessarily limited thereto, and functions of the controllers 1, 10, and 70 may be merged into one ECU or the vehicle controller 3, or one ECU or the vehicle controller may be used for multiple purposes.

The ECU and the vehicle controller 3 may be implemented as various processing devices such as a microprocessor in which a semiconductor chip or the like capable of performing various calculations, commands or the like is embedded, and may control operations of respective components corresponding to the corresponding controllers.

The autonomous driving controller 1 may have a function of sensing and processing external information by the sensor system 2 at the time of driving even though the driver does not manipulate a brake pedal, a steering wheel, an accelerator pedal, or the like. The autonomous driving controller may determine a driving route of the vehicle by itself by recognizing the surrounding environment.

The autonomous driving controller 1 may transmit a control signal, requested acceleration/deceleration information and the like to the main braking controller 10 through communication. The autonomous driving controller 1 may receive wheel speed information from the main braking controller 10 through communication.

For example, the autonomous driving controller 1 may include a highway driving pilot (HDP) controller for a mode such as highway driving pilot.

In addition, the autonomous driving controller 1 may be electrically connected to a display 4 and transmit information related to running of the vehicle and a failure alarm to the display 4, and the display 4 may visually display this information and failure alarm to the driver through a text or blinking of a lamp.

The main braking controller 10 controls a brake of the vehicle. Here, the brake may generate a brake hydraulic pressure according to a request of the autonomous driving controller 1 (or pressure applied to the brake pedal by the driver if necessary) and transmit the brake hydraulic pressure to a wheel cylinder installed on each wheel to perform friction braking.

The main braking controller 10 may include an integrated electric booster (IEB) or an integrated dynamic brake.

The backup braking controller 70 controls the brake on behalf of the main braking controller 10 in a situation in which a braking force does not act on each wheel due to a failure of the main braking controller 10. Here, the brake may generate a brake hydraulic pressure according to a request of the autonomous driving controller 1 (or pressure applied to the brake pedal by the driver if necessary) and transmit the brake hydraulic pressure to the wheel cylinder installed on each wheel to perform friction braking.

The backup braking controller 70 may exchange various types of information, signals and the like required for braking with the main braking controller 10 through a communication link 9.

In the communication link 9, for example, wireless communications such as a local area network using a controller area network (CAN) protocol may be applied, but the present disclosure is not limited thereto, and wired or optical communication may be applied.

In addition, the backup braking controller 70 may be electrically connected to an electronic parking brake (EPB) 5. Alternatively, the ECU of the backup braking controller 70 may control the EPB to allow the EPB to electronically perform braking.

The main braking controller 10 and the backup braking controller 70 may constitute a brake redundancy device B.

The brake redundancy device basically performs control so that the brake hydraulic pressure is transferred to each wheel along a hydraulic circuit of the main braking controller 10. However, when the brake hydraulic pressure may not be formed due to a failure of the main braking controller, the brake redundancy device may perform control so that the brake hydraulic pressure is transferred to each wheel along a hydraulic circuit of the backup braking controller 70.

In other words, the brake redundancy device is configured so that the backup braking controller 70 may be in charge of braking of the autonomous vehicle in an emergency situation in which a malfunction of the main braking controller 10 occurs.

The sensor system 2 may sense and output vehicle internal information and vehicle external information. Here, the vehicle internal information refers to information measured by various sensors installed in the vehicle, such as a wheel speed sensor, a steering angle sensor, and a yaw rate sensor. In addition, the vehicle external information refers to Information refers to information collected by a radio detection and ranging (RADAR) sensor, a light detection and ranging (LIDAR) sensor, an image sensor, an acceleration sensor, and the like, in order to recognize obstacles or lanes on a road on which the vehicle is traveling or grasp a traveling route of the vehicle or the surrounding vehicle.

For example, the autonomous driving controller 1 may receive the vehicle external information from the sensor system 2 and calculate a required longitudinal deceleration/acceleration of the vehicle. Based on a calculated value of the required deceleration/acceleration, the main braking controller 10 or the backup braking controller 70 of the brake redundancy device arbitrates brake pressure control for deceleration of the vehicle controller 3 and driving torque control for acceleration of the vehicle controller 3.

First, a configuration and an operation flow of the brake redundancy device B to which the IEB is applied will be described in order to help the understanding of the present disclosure.

Figure 2:
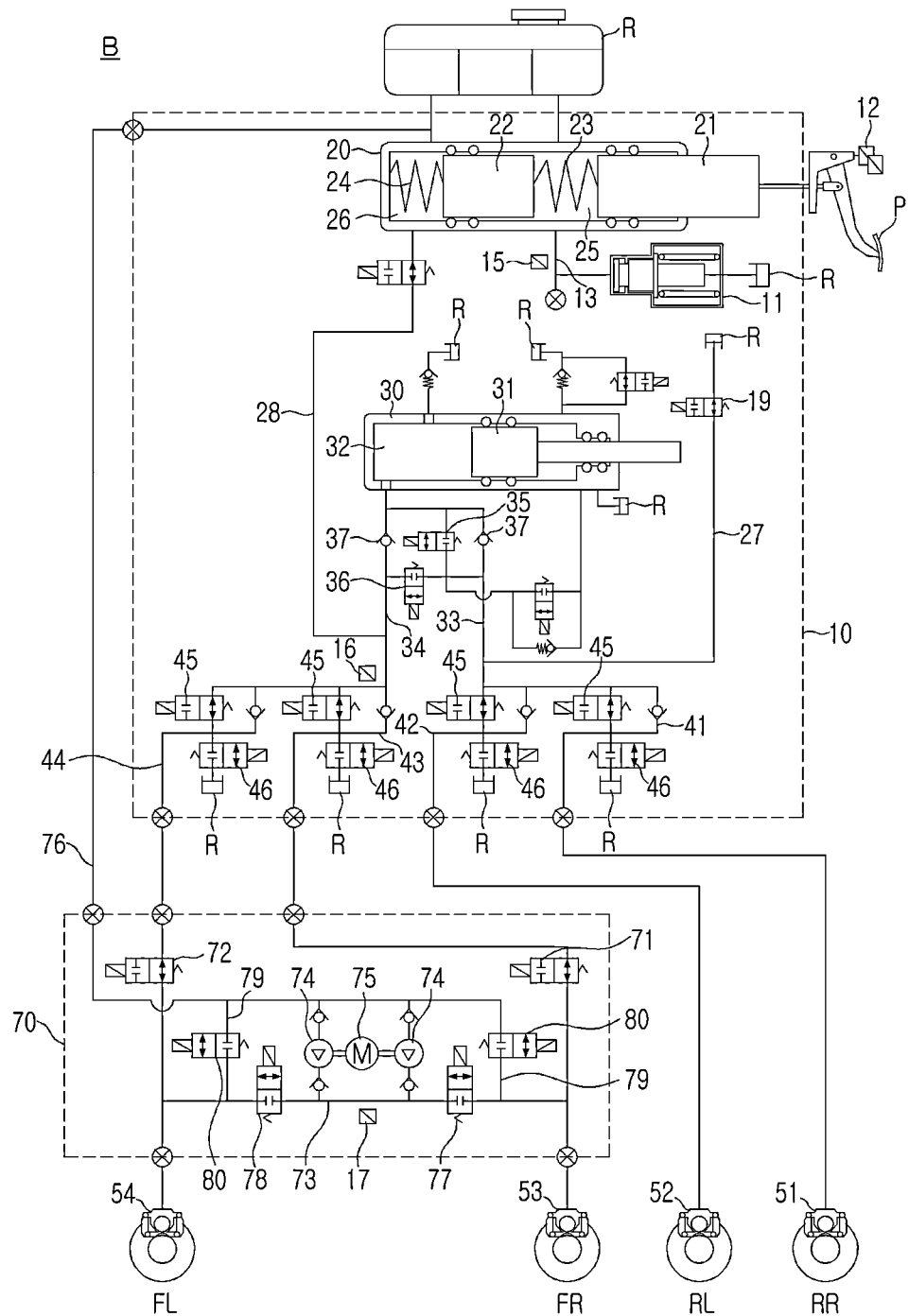
FIG. 2 is a hydraulic circuit diagram of the brake redundancy device.

FIG. 2 is a hydraulic circuit diagram of the brake redundancy device.

A reservoir R may store hydraulic oil for generating a hydraulic pressure. The reservoir may include three reservoir chambers, which may be arranged side by side in a row.

Adjacent reservoir chambers in the reservoir R may be partitioned by partition walls. Each partition wall may be partially opened, such that that the reservoir chambers may communicate with each other. Accordingly, pressures of the reservoir chambers may be the same as each other, and as an example, the pressures of the reservoir chambers, that is, a pressure in the reservoir, may be an atmospheric pressure.

A brake pedal P is connected to a first master cylinder 20. A main piston 21 directly connected to the brake pedal, and a sub-piston 22 connected to the main piston by a first spring 23 and connected to an inner wall surface of one side of the first master cylinder by a second spring 24 may be installed inside the first master cylinder.

Inside the first master cylinder 20, a space between the main piston 21 and the sub-piston 22 may be partitioned as a first hydraulic chamber 25, and a space between the sub-piston and the inner wall surface of one side of the first master cylinder may be partitioned as a second hydraulic chamber 26. The first hydraulic chamber and the second hydraulic chamber may be connected to the reservoir R.

In addition, a pedal simulator 11 may be connected to the first hydraulic chamber 25. The pedal simulator functions to simulate braking feeling by providing a predetermined level of reaction force to a hydraulic pressure generated when the driver depresses the brake pedal P.

In the main braking controller 10 of the brake redundancy device, an actual brake hydraulic pressure is generated in a second master cylinder 30 operated by driving of a first motor (not illustrated).

A power piston 31 for generating a brake hydraulic pressure may be installed inside the second master cylinder 30 so as to be movable forward and rearward.

A front surface portion of the power piston 31 may partition the hydraulic pressure generating chamber 32 together inner wall surfaces of the second master cylinder 30. The hydraulic oil for generating the hydraulic pressure may be supplied from the reservoir R to the hydraulic pressure generating chamber.

A first motor providing forward/rearward motion force to the power piston may be connected to a rear end portion of the power piston 31.

The second master cylinder 30 and the first motor may constitute a hydraulic pressure supply unit. The hydraulic pressure supply unit may include a power transmission mechanism (not illustrated) converting a rotational motion of the first motor into a linear motion and transferring the linear motion to the power piston 31 of the second master cylinder.

A first hydraulic pressure supply line 33 and a second hydraulic pressure supply line 34 are connected to the hydraulic pressure generating chamber 32 of the second master cylinder 30 in order to supply a brake hydraulic pressure generated by a forward movement driving force of the power piston 31 toward the wheels at the time of braking.

Preferably, the first hydraulic pressure supply line 33 and the second hydraulic pressure supply line 34 may be installed with a normal close-type relief valve 35 making the hydraulic pressure generated by the power piston 31 flow toward wheel cylinders and a normal close-type balancing valve 36 acting as a flow control valve so as to balance a hydraulic pressure flowing to the first hydraulic pressure supply line and the second hydraulic pressure supply line by synchronizing the first hydraulic pressure supply line and the second hydraulic pressure supply line with each other.

The relief valve 35 and the balancing valve 36 are controlled by the ECU of the main braking controller 10 to operate to be opened when the brake hydraulic pressure generated by the power piston 31 is supplied to the wheels at the time of braking.

The balancing valve 36 may operate to be opened when the hydraulic pressure of the wheel cylinder of the second hydraulic pressure supply line 34 is taken out and sent to the first hydraulic pressure supply line 33. In this case, the relief valve 35 may operate to be closed, and may thus block the hydraulic pressure of the wheel cylinder from being sent to the hydraulic pressure generating chamber 32, together with check valves 37.

A first hydraulic pressure branch line 41 and a second hydraulic pressure branch line 42 connected to a wheel cylinder 51 of a rear right wheel RR and a wheel cylinder 52 of a rear left wheel RL, respectively, may be branched from the first hydraulic pressure supply line 33.

A third hydraulic pressure branch line 43 and a fourth hydraulic pressure branch line 44 connected to a wheel cylinder 53 of a front right wheel FR and a wheel cylinder 54 of a front left wheel FL, respectively, may be branched from the second hydraulic pressure supply line 34.

Each of the first to fourth hydraulic pressure branch lines 41, 42, 43, and 44 may be mounted with a normal open-type wheel inlet valve 45 transferring the hydraulic pressure to each wheel cylinder and a normal close-type wheel outlet valve 46 operated in order to discharge the hydraulic pressure of the wheel cylinder toward the reservoir R.

In addition, the main braking controller 10 may include first and second backup lines 27 and 28 that may directly supply the hydraulic oil discharged from the first master cylinder 20 to the wheel cylinders 51 to 54 in an emergency.

The first backup line 27 may be provided with a normal open-type first cut valve 19 for controlling the flow of the hydraulic oil. The second backup line 28 may be provided with a normal open-type second cut valve 29 for controlling the flow of the hydraulic oil. In addition, the first backup line may connect the reservoir R and the first hydraulic pressure supply line 33 to each other. The second backup line may connect the second hydraulic chamber 26 of the first master cylinder 20 and the second hydraulic pressure supply line 34 to each other.

Meanwhile, a pedal travel sensor 12 sensing a stroke when the driver depresses the brake pedal P may be mounted at a position adjacent to the brake pedal P.

A first pressure sensor 15 sensing the hydraulic pressure generated in the first master cylinder 20 as the driver operates the brake pedal may be mounted on a bleeding line 13 of the pedal simulator 11 or the second backup line 28.

A second pressure sensor 16 sensing the actual brake hydraulic pressure generated by an operation of the power piston 31 may be mounted on the first hydraulic pressure supply line 33 or the second hydraulic pressure supply line 34.

Accordingly, after the ECU of the main braking controller 10 receives sensed signals of the pedal travel sensor 12, the first pressure sensor 15, and the second pressure sensor 16, the ECU of the main braking controller 10 may control the first motor, the relief valve 35, the balancing valve 36, the wheel inlet valve 45, the wheel outlet valve 46, the first and second cut valves 19 and 29, and the like, to be opened and closed based on the received sensed signals.

The backup braking controller 70 may be provided in, for example, the third hydraulic pressure branch line 43 supplying the hydraulic pressure from the second hydraulic pressure supply line 34 to the wheel cylinder 53 of the front right wheel FR and the fourth hydraulic pressure branch line 44 supplying the hydraulic pressure from the second hydraulic pressure supply line 34 to the wheel cylinder 54 of the front left wheel FL.

The backup braking controller 70 may include a normal open-type first flow passage valve 71 mounted on the third hydraulic pressure branch line 43 and controlling a flow of the hydraulic pressure, a normal open-type second flow passage valve 72 mounted on the fourth hydraulic pressure branch line 44 and controlling a flow of the hydraulic pressure, a connection line 73 connecting the third hydraulic pressure branch line and the fourth hydraulic pressure branch line to each other between the first and second flow passage valves and the wheel cylinders 53 and 54, at least one pump 74 provided on the connection line, a second motor 75 driving the pump, a backup supply line 76 connecting the pump and the reservoir R to each other, a normal close-type first inlet valve 77 provided on the connection line and controlling a flow of hydraulic pressure supplied from the pump to the wheel cylinder 53 of the front right wheel FR, and a normal close-type second inlet valve 78 provided on the connection line and controlling a flow of hydraulic pressure supplied from the pump to the wheel cylinder 54 of the front left wheel FL.

In addition, the backup braking controller 70 may further include a bypass line 79 connecting an upstream and a downstream of the pump 74 to each other. The bypass line may be installed with a normal close-type relief valve 80 making a hydraulic pressure generated by the pump and applied to the wheel cylinders 53 and 54 flow toward the reservoir R.

A third pressure sensor 17 sensing an actual brake hydraulic pressure generated by an operation of the pump 74 may be mounted on the connection line 73. In addition, a motor sensor (not illustrated) controlling and sensing a rotation angle or a current of the second motor 75 may be installed on or connected to the second motor 75.

The backup braking controller 70 may include the second motor 75, the pump 74 and several valves, and the numbers of second motors, pumps, and valves may be variously changed according to system specifications.

In addition, the backup braking controller 70 may be installed between the second hydraulic pressure supply line 34 and two wheels, but is not limited thereto, and may be installed between the first hydraulic pressure supply line 33 and the two wheels. In addition, the backup braking controller 70 may be installed at various positions capable of providing the hydraulic pressure to the wheel cylinder of each wheel.

According to such a backup braking controller 70, the hydraulic pressure pumped by the pump 74 from the reservoir R is transferred to the wheel cylinder 53 of the front right wheel FR and the wheel cylinder 54 of the front left wheel FL through the connection line 73 to enable emergency braking of the vehicle.

Next, a flow of operations of the main braking controller 10 will be described.

In an autonomous driving mode, the brake hydraulic pressure provided to the wheel cylinders 51 to 54 is generated by the power piston 31 of the second master cylinder 30 operated by the driving of the first motor.

The first motor is driven by a control signal of the ECU, and accordingly, the power piston 31 in the second master cylinder 30 may pressurize the hydraulic oil in the hydraulic pressure generating chamber 32 while moving forward.

The normal close-type relief valve 35 and balancing valve 36 become an opened state, such that the hydraulic pressure (the pressurized hydraulic oil) may be supplied to the first hydraulic pressure supply line 33 and the second hydraulic pressure supply line 34.

The hydraulic pressure may branch and flow into the first to fourth hydraulic pressure branch lines 41 to 44, and be then supplied to the respective wheel cylinders 51 to 54 through the wheel inlet valves 45 in a normal open state.

Therefore, substantial braking may be performed in a normal state of the autonomous driving mode.

In such an autonomous driving mode, when the driver depresses the brake pedal P, the pedal travel sensor 12 senses a pedal stroke and sends a sensed signal to the ECU.

Subsequently, the hydraulic oil in the first hydraulic chamber 25 is moved to the pedal simulator 11 while the main piston 21 in the first master cylinder 20 connected to the brake pedal P is pressurized, and a reaction force of the pedal simulator is transferred to the brake pedal through the hydraulic oil, such that the driver that is depressing the brake pedal feels braking feeling.

In this case, the second cut valve 29 mounted on the second backup line 28 becomes a closed state by a control signal of the ECU, such that the hydraulic oil existing in the second hydraulic chamber 26 of the first master cylinder 20 is not transferred toward the wheel cylinders 51 to 54.

In a driver mode, the brake hydraulic pressure provided to the wheel cylinders 51 to 54 may be generated by the first master cylinder 20 connected to the brake pedal P.

When the driver depresses the brake pedal P, the pedal travel sensor 12 senses a pedal stroke and sends a sensed signal to the ECU.

The second cut valve 29 mounted on the second backup line 28 and the balancing valve 36 between the first hydraulic pressure supply line 33 and the second hydraulic pressure supply line 34 become an opened state by a control signal of the ECU, such that the hydraulic pressure (pressurized hydraulic oil) may be supplied to the first hydraulic pressure supply line 33 and the second hydraulic pressure supply line 34.

The hydraulic pressure may branch and flow into the first to fourth hydraulic pressure branch lines 41 to 44, and be then supplied to the respective wheel cylinders 51 to 54 through the wheel inlet valves 45 in a normal open state.

Next, a flow of operations of the backup braking controller 70 will be described.

When a redundancy situation is sensed, the ECU of the backup braking controller 70 switches the first flow passage valve 71 and the second flow passage valve 72 to a closed state, and applies power to the second motor 75 to generate a rotational force, thereby driving the pump 74, and switches the first inlet valve 77 and the second inlet valve 78 to an opened state.

Accordingly, the hydraulic pressure pumped by the pump 74 from the reservoir R is transferred to the wheel cylinders 53 and 54 each provided in the front right wheel FR and the front left wheel FL through the connection line 73 to enable the emergency braking of the vehicle.

As described above, the brake redundancy device may implement a front-wheel braking mode of the backup braking controller 70 capable of transferring the hydraulic pressure to at least the wheel cylinders 53 and 54 of the front wheels in the redundancy situation.

The minimum risk maneuver of the vehicle may be started and performed from the front-wheel braking mode of the backup braking controller 70, such that a subsequent safety function may be exhibited in autonomous driving.

Since the main braking controller 10 has superior pressure boosting and control performance than the backup braking controller 70, unless braking by the main braking controller 10 is completely impossible, the main braking controller 10 may maintain braking control as much as possible at the time of autonomous driving of the vehicle.

However, when the brake redundancy device enters the redundancy situation due to a failure of a power supply unit, the ECU, a valve, or the like, required for an operation of the main braking controller 10, a subject of braking control of the brake redundancy device may be switched to the backup braking controller 70.

In this case, basic braking may be carried out with braking of the front wheels through the front-wheel braking mode described above. In addition, the control of an anti-lock brake system (ABS) preventing the wheels from slipping at the time of braking may be carried out with the front-wheel braking by the front-wheel braking mode and rear-wheel braking by the EPB. In this case, an operation of the EPB may be controlled by the ECU of the backup braking controller 70.

In the present disclosure, when the brake redundancy device enters the redundancy situation due to a failure in the hydraulic pressure supply unit of components of the main braking controller 10, that is, the second master cylinder 30, the first motor, the power transmission mechanism, or the like, the main braking controller 10 performs cooperative control together with the backup braking controller 70 to provide the hydraulic pressure from the backup braking controller 70 to a portion of the main braking controller 10, such that four-wheel or all-wheel braking may be performed.

To this end, a method of operating a brake redundancy device according to an exemplary embodiment of the present disclosure may include a failure determining step of monitoring and determining failures of components by each of the main braking controller 10 and the backup braking controller 70.

Figure 3:
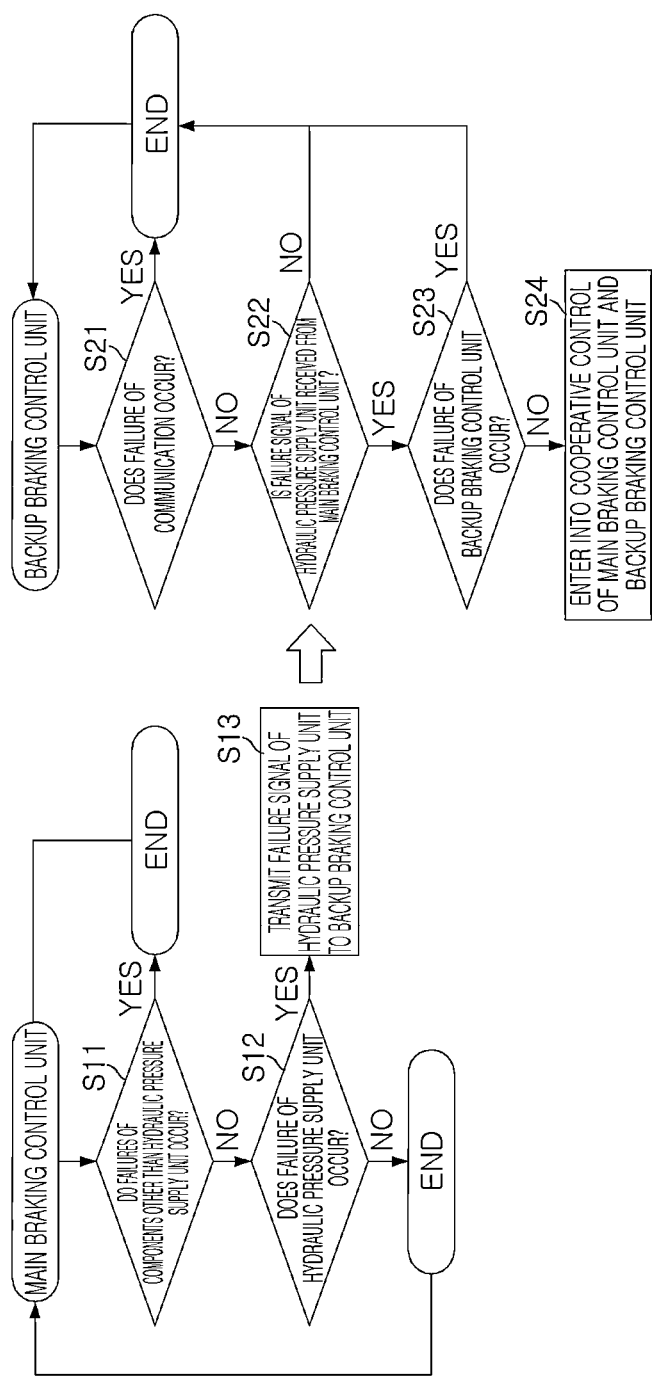
FIG. 3 is a flowchart illustrating a failure determining step in a method of operating a brake redundancy device according to an exemplary embodiment of the present disclosure.

FIG. 3 is a flowchart illustrating a failure determining step in a method of operating a brake redundancy device according to an exemplary embodiment of the present disclosure.

The failure determining step may include: monitoring and determining a failure of the hydraulic pressure supply unit by the main braking controller 10 (S12); transmitting a failure signal to the backup braking controller 70 (S13) when it is determined that the failure of the hydraulic pressure supply unit has occurred; confirming whether or not the failure signal of the hydraulic pressure supply unit has been received from the main braking controller 10 by the backup braking controller 70 (S22); determining a failure of the backup braking controller 70 (S23) when the failure signal of the hydraulic pressure supply unit has been received; and entering into cooperative control of the main braking controller 10 and the backup braking controller 70 (S24) when there is no failure of the backup braking controller 70.

In addition, the failure determining step may further include, before the monitoring and determining of the failure of the hydraulic pressure supply unit (S12), monitoring and determining failures of components other than the hydraulic pressure supply unit by the main braking controller 10 (S11).

When the brake redundancy device enters the redundancy situation due to the failure of the power supply unit, the ECU, the valve, or the like, of the main braking controller 10, the method of operating a brake redundancy device according to the present disclosure may end.

When there are no failures of the components other than the hydraulic pressure supply unit, the monitoring and determining of the failure of the hydraulic pressure supply unit (S12) may be performed.

A motor sensor (not illustrated) controlling and sensing an rotation angle or a current of the first motor may be installed on or connected to the first motor of the hydraulic pressure supply unit, and when there is an abnormality in a current value input from the motor sensor, the ECU of the main braking controller 10 may decide that the failure of the hydraulic pressure supply unit has occurred.

Alternatively, when there is an abnormality in a pressure value input from the second pressure sensor 16 sensing the brake hydraulic pressure generated by the operation of the power piston 31 in the second master cylinder 30 of the hydraulic pressure supply unit, the ECU of the main braking controller 10 may decide that the failure of the hydraulic pressure supply unit has occurred.

When it is determined that the failure of the hydraulic pressure supply unit has occurred, the ECU of the main braking controller 10 may transmit a failure signal to the ECU of the backup braking controller 70 through the communication link 9. When there is no failure of the main braking controller 10, the method of operating a brake redundancy device according to the present disclosure may end.

The failure determining step may further include, before the confirming whether or not the failure signal of the hydraulic pressure supply unit has been received (S22), determining whether or not a failure of communication has occurred, by the backup braking controller 70 (S21).

Whether or not the failure of the communication has occurred may be determined by confirming an operation of a corresponding communication module included in the ECU of the backup braking controller 70 or the main braking controller 10 or according to a result periodically performed by a communication network itself.

When a failure occurs in communication between the main braking controller 10 and the backup braking controller 70 due to an inoperable state, disconnection or the like of the communication link 9, the method of operating a brake redundancy device according to the present disclosure may end.

When there is no failure in the communication, the confirming whether or not the failure signal of the hydraulic pressure supply unit has been received (S22) may be performed, and when the failure signal of the hydraulic pressure supply unit has been received, the determining of the failure of the backup braking controller 70 (S23) may be performed.

The ECU of the backup braking controller 70 may confirm whether or not a failure of the second motor 75, the pump 74, and the valves constituting the backup braking controller 70 has occurred.

When there is an abnormality in a current value input from the motor sensor of the second motor 75, the ECU of the backup braking controller 70 may decide that the failure of the backup braking controller 70 has occurred.

Alternatively, when there is an abnormality in a pressure value input from the third pressure sensor 17 sensing the brake hydraulic pressure generated by the pump 74 and the valve, the ECU of the backup braking controller 70 may decide that the failure of the backup braking controller 70 has occurred.

When it is determined that a failure of at least one of the components of the backup braking controller 70 has occurred, the method of operating a brake redundancy device according to the present disclosure may end.

When there is no failure of the backup braking controller 70, the entry into the cooperative control of the main braking controller 10 and the backup braking controller 70 may be performed (S24).

In the method of operating a brake redundancy device according to an exemplary embodiment of the present disclosure, the hydraulic pressure may be provided from the backup braking controller 70 to a portion of the main braking controller 10 through the cooperative control of the main braking controller 10 and the backup braking controller 70.

Figure 4:
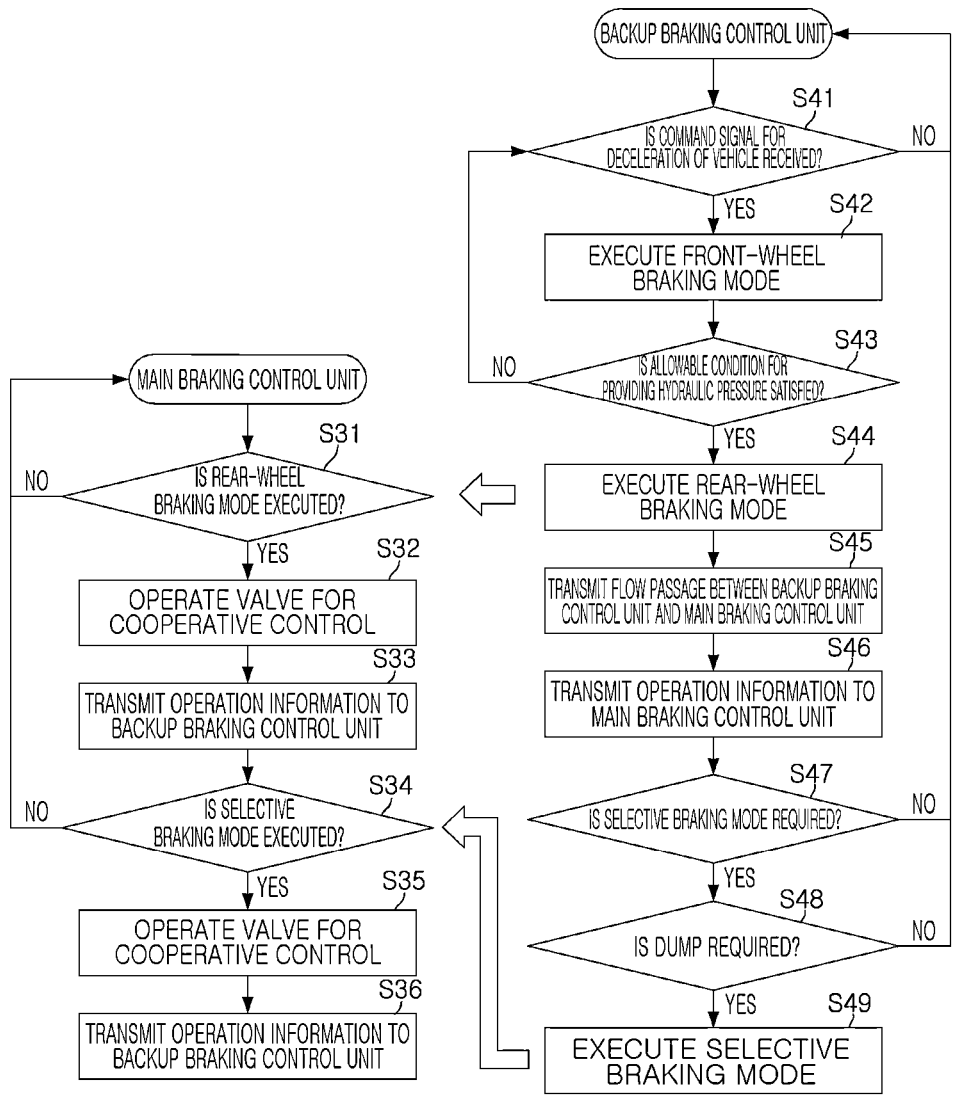
FIG. 4 is a flowchart illustrating a method of operating a brake redundancy device according to an exemplary embodiment of the present disclosure.

FIG. 4 is a flowchart illustrating a method of operating a brake redundancy device according to an exemplary embodiment of the present disclosure.

The method of operating a brake redundancy device according to an exemplary embodiment of the present disclosure may include: confirming whether or not a command signal for deceleration of a vehicle has been received, by the backup braking controller 70 (S41); executing a front-wheel braking mode (S42) when the command signal has been received; determining whether or not an allowable condition for providing the hydraulic pressure to the wheel cylinders 51 and 52 of the rear wheels has been satisfied (S43); and executing a rear-wheel braking mode through cooperative control of the main braking controller 10 and the backup braking controller (S44) when the allowable condition has been satisfied.

The command signal for deceleration of the vehicle may be transmitted by the autonomous driving controller 1 and received by the ECU of the backup braking controller 70. For example, the autonomous driving controller may decide whether or not the vehicle needs to be decelerated based on external information sensed by the sensor system 2 at the time of driving, and may transmit the command signal for the deceleration of the vehicle.

Alternatively, when the driver depresses the brake pedal P, the pedal travel sensor 12 may sense a pedal stroke, and the ECU of the backup braking controller 70 may receive a sensed signal for the pedal stroke and may consider the sensed signal as the command signal. In this case, in addition to braking control of the driver, the system of the vehicle cooperates with the braking control, such that the entire braking safety of the vehicle may be more reliably ensured.

Figure 5:
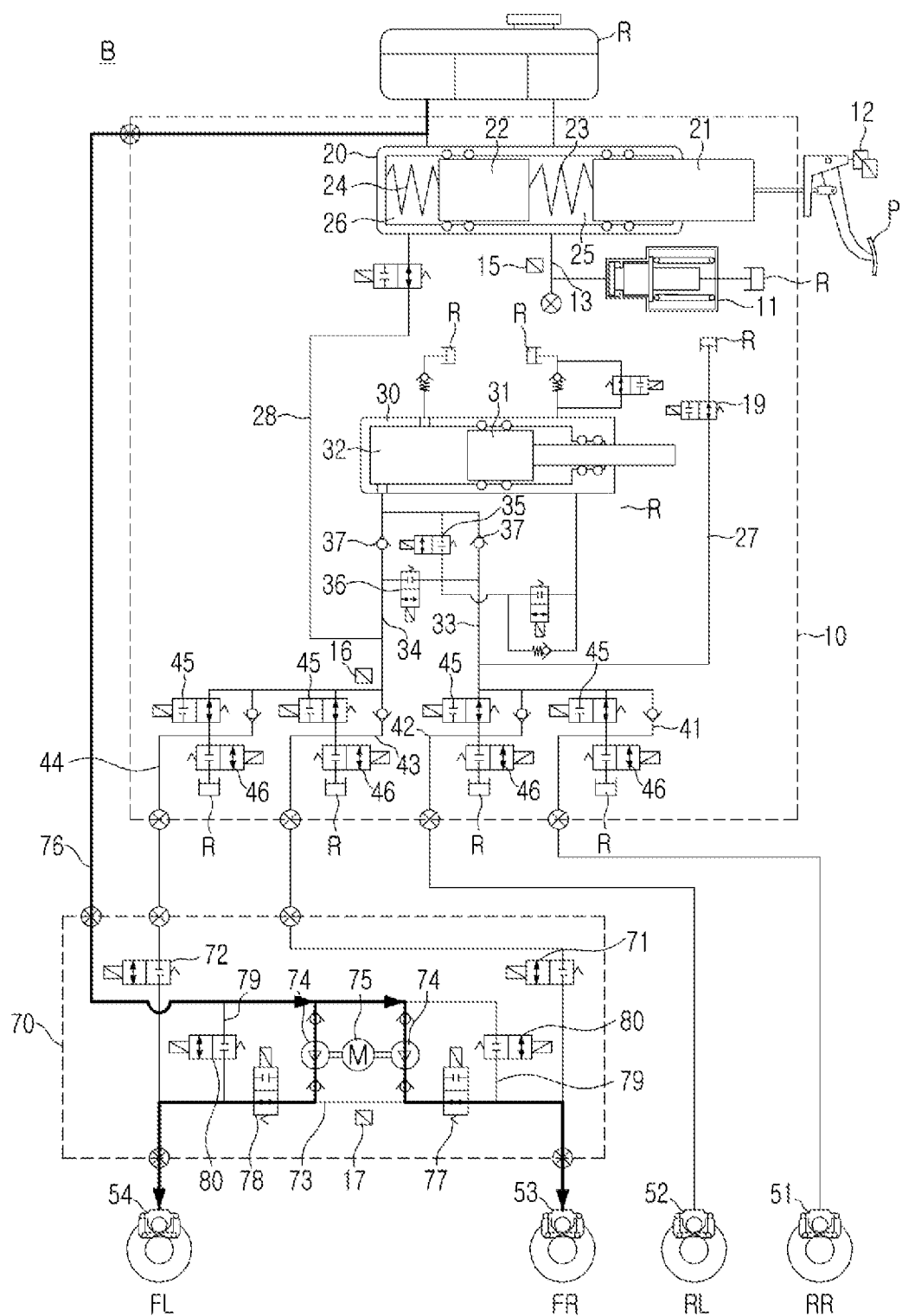
FIGS. 5, 6 and 7 are hydraulic circuit diagrams for each operation mode of the method of operating a brake redundancy device according to an exemplary embodiment of the present disclosure.

A hydraulic circuit diagram when the backup braking controller 70 executes a front-wheel braking mode is illustrated in FIG. 5.

In the front-wheel braking mode, the hydraulic pressure may be transferred to the wheel cylinders 53 and 54 of the front wheels by the operation of the backup braking controller 70.

As described above, in the front-wheel braking mode, the ECU of the backup braking controller 70 switches the first flow passage valve 71 and the second flow passage valve 72 of the backup braking controller 70 to the closed state, and applies the power to the second motor 75 to generate the rotational force, thereby driving the pump 74, and switches the first inlet valve 77 and the second inlet valve 78 to the opened state.

Accordingly, the hydraulic pressure pumped by the pump 74 from the reservoir R is transferred to the wheel cylinders 53 and 54 each provided in the front right wheel FR and the front left wheel FL through the connection line 73 to enable braking of the front wheels.

The allowable condition for providing the hydraulic pressure to the wheel cylinders 51 and 52 of the rear wheels may include a condition in which a value of a hydraulic pressure sensed by the third pressure sensor 17 on the connection line 73 of the backup braking controller 70 is equal to a predetermined reference value or more.

A reference value of the hydraulic pressure may be set, for example, to approximately 40 bar, and when the hydraulic pressure is 40 bar or more, the cooperative control 5 of the main braking controller 10 and the backup braking controller 70 is possible, such that it may be determined that the hydraulic pressure is sufficient for the braking of the rear wheels together with the braking of the front wheels.

In addition, the allowable condition for providing the hydraulic pressure to the wheel cylinders of the rear wheels may include a condition in which an amount of required longitudinal deceleration/acceleration of the vehicle calculated by the autonomous driving controller 1 is equal to a predetermined reference value or more.

The reference of value the required deceleration/acceleration may be set, for example, to approximately 0.4 g ($0.4 \times 9.8$ m/s$^2$), and when the required deceleration/acceleration is less than 0.4 g, it may be determined that the braking of the rear wheels is not required because only the braking of the front wheels is sufficient to perform a braking function of the brake redundancy device.

When the allowable condition is satisfied, the rear-wheel braking mode may be executed through the cooperative control of the main braking controller 10 and the backup braking controller 70.

Figure 6:
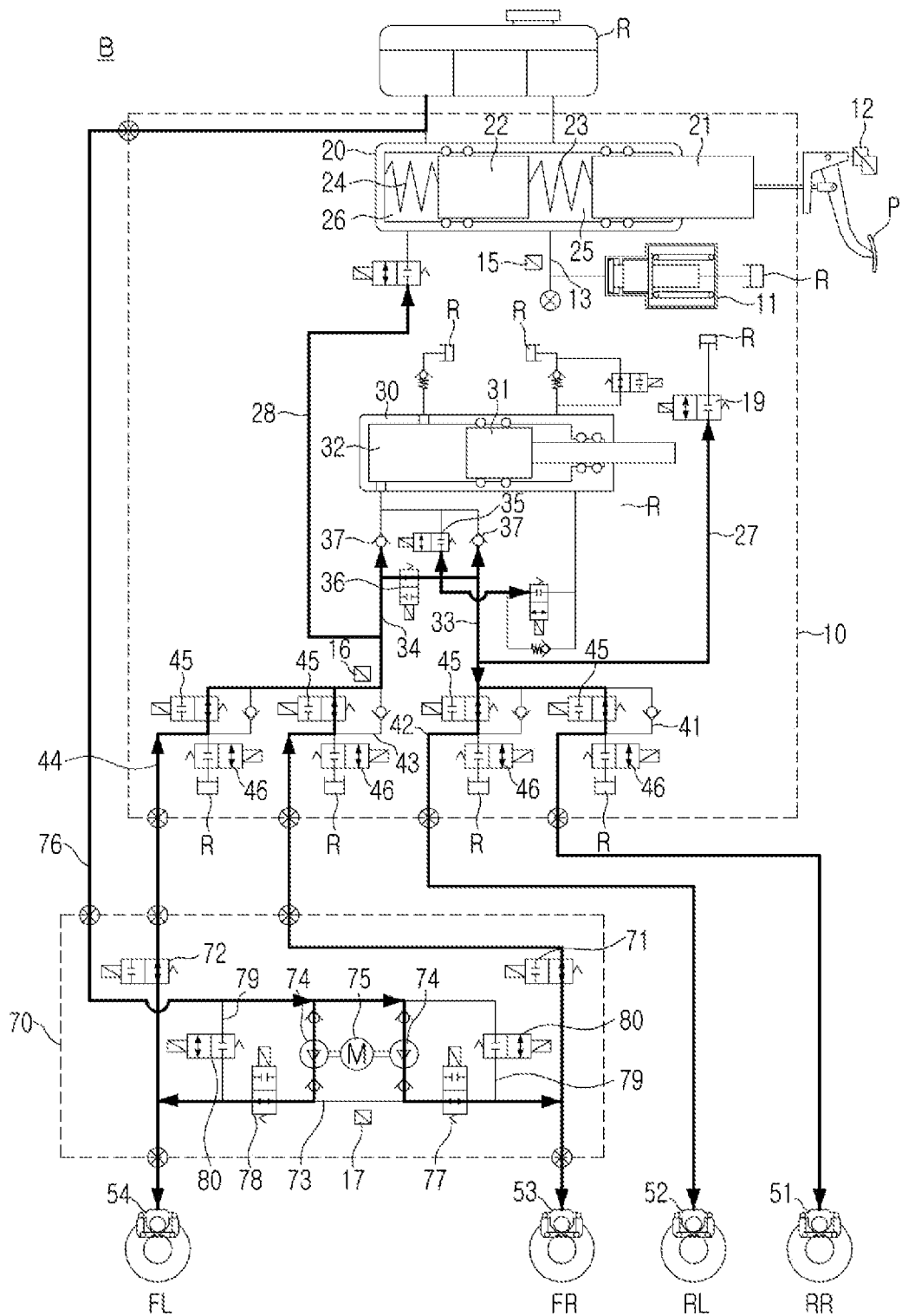

A hydraulic circuit diagram when the rear-wheel braking mode is executed through the cooperative control of the main braking controller 10 and the backup braking controller 70 is illustrated in FIG. 6.

The executing of the rear-wheel braking mode (S44) may include opening a flow passage between the backup braking controller 70 and the main braking controller 10 (S45) and transmitting operation information of the backup braking controller 70 to the main braking controller 10 (S46). Therefore, in the executing of the rear-wheel braking mode, the hydraulic pressure may be provided from the backup braking controller 70 to a partial hydraulic circuit of the main braking controller 10.

The ECU of the backup braking controller 70 may switch the first flow passage valve 71 and the second flow passage valve 72 of the backup braking controller 70 to an opened state to connect the flow passage between the backup braking controller 70 and the main braking controller 10 through the third hydraulic pressure branch line 43 and the fourth hydraulic pressure branch line 44.

The operation information of the backup braking controller 70 may include information on the hydraulic pressure sensed by the third pressure sensor 17 and a current inputted from the motor sensor of the second motor 75. The ECU of the backup braking controller 70 may transmit the operation information to the ECU of the main braking controller 10 through the communication link 9.

The executing of the rear-wheel braking mode (S44) may include confirming whether or not the rear-wheel braking mode has been executed through the cooperative control, by the main braking controller 10 (S31); operating a valve for the cooperative control of the main braking controller 10 (S32) when it is determined that the rear-wheel braking mode is being executed; and transmitting operation information of the main braking controller 10 to the backup braking controller 70 (S33).

In the confirming whether or not the rear-wheel braking mode has been executed (S31), it may be determined that the rear-wheel braking mode is being executed based on the operation information received from the backup braking controller 70.

For the cooperative control of the main braking controller 10, the first cut valve 19 mounted on the first backup line 27 and the second cut valve 29 mounted on the second backup line 28 becomes a closed state and the balancing valve 36 positioned between the first hydraulic pressure supply line 33 and the second hydraulic pressure supply line 34 becomes an opened state, by the control signal from the ECU, such that the hydraulic pressure (pressurized hydraulic oil) input from the backup braking controller 70 may be supplied to the first hydraulic pressure supply line and the second hydraulic pressure supply line of the main braking controller 10.

More specifically, first, the hydraulic pressure pumped by the pump 74 from the reservoir R is transferred to the wheel cylinders 53 and 54 each provided in the front right wheel FR and the front left wheel FL through the connection line 73, such that the braking of the front wheels may be maintained.

Next, the hydraulic pressure pumped by the pump 74 from the reservoir R may flow to the third hydraulic pressure branch line 43 and the fourth hydraulic pressure branch line 44 through the connection line 73, pass through the wheel inlet valves 45 in the normal open state in an opposite direction to the front-wheel braking mode, and reach the second hydraulic pressure supply line 34.

Since the balancing valve 36 is in the opened state, the hydraulic pressure of the second hydraulic pressure supply line 34 may be transferred to the first hydraulic pressure supply line 33, may branch and flow into the first and second hydraulic pressure branch lines 41 and 42, may pass through the wheel inlet valves 45 in the normal open state, and may then be supplied to the wheel cylinders 51 and 52 each provided in the rear right wheel RR and the rear left wheel RL. Therefore, braking of the rear wheels is enabled.

When the first cut valve 19 becomes a closed state, the hydraulic oil existing in the first hydraulic pressure supply line 33 is not transferred toward the reservoir R, and the second cut valve 29 becomes a closed state, such that the hydraulic oil existing in the second hydraulic pressure supply line 34 is not transferred toward the second hydraulic chamber 26 of the first master cylinder 20.

The operation information of the main braking controller 10 may include information on a hydraulic pressure sensed by the second pressure sensor 16. The ECU of the main braking controller may transmit the operation information to the ECU of the backup braking controller 70 through the communication link 9.

With the method of operating a brake redundancy device according to an exemplary embodiment of the present disclosure, the hydraulic pressure is provided from the backup braking controller 70 to a portion of the main braking controller 10 without operating the EPB at the time of the failure of the main braking controller 10, such that the backup braking controller 70 may perform four-wheel braking or all-wheel braking, and an effect of maximizing noise, vibration and harshness (NVH) reduction performance and behavioral stability of the vehicle is thus obtained.

A method of operating a brake redundancy device according to an exemplary embodiment of the present disclosure may further include executing a selective braking mode of imparting a difference in braking force between the rear right wheel RR and the rear left wheel RL through the cooperative control of the main braking controller 10 and the backup braking controller 70 for vehicle stability control.

Such a selective braking mode is an additional function that may be carried out separately from the vehicle stability control by the ESC, and may be executed by providing different hydraulic pressures to the rear wheels for the vehicle stability control.

The selective braking mode may include determining whether or not the selective braking mode is required (S47); determining whether or not a dump for dumping the hydraulic pressure is required (S48) when it is determined that the selective braking mode is required; and executing the selective braking mode through the cooperative control of the main braking controller 10 and the backup braking controller 70 (S49) when the dump is required.

In the determining of whether or not the selective braking mode is required (S47), the ECU of the backup braking controller 70 may receive vehicle internal information from the sensor system 2 sensing a state of the vehicle, such as a steering angle sensor and a yaw rate sensor of the vehicle. The ECU of the backup braking controller 70 may decide whether or not braking in the selective braking mode is required by comparing and calculating, for example, an actual yaw value of the vehicle and a steering value intended by the driver with each other using the vehicle internal information.

When it is determined that the braking in the selective braking mode is required, the ECU of the backup braking controller 70 may calculate a required braking force using mechanical equations, and decide whether or not the dump is required according to a calculated value.

Here, the calculation of the braking force for the vehicle stability control is a well-known technology, and a detailed description thereof is thus omitted.

In braking control using the hydraulic pressure, there are an apply state of increasing a braking force by increasing the hydraulic pressure, a hold state of constantly holding the hydraulic pressure, and a dump state of dumping the hydraulic pressure.

In the selective braking mode of the method of operating a brake redundancy device according to an exemplary embodiment of the present disclosure, the hold state and the dump state may be carried out. Accordingly, when it is calculated that a braking force required for any one of the rear light wheel RR and the rear left wheel RL needs to be dumped as compared with a current braking force, that is, when the dump is required, the selective braking mode may be executed through the cooperative control of the main braking controller 10 and the backup braking controller 70.

When the dump is not required, the hold state of constantly holding the hydraulic pressure may be executed. In this case, the front-wheel braking mode and the rear-wheel braking mode may be maintained.

Figure 7:
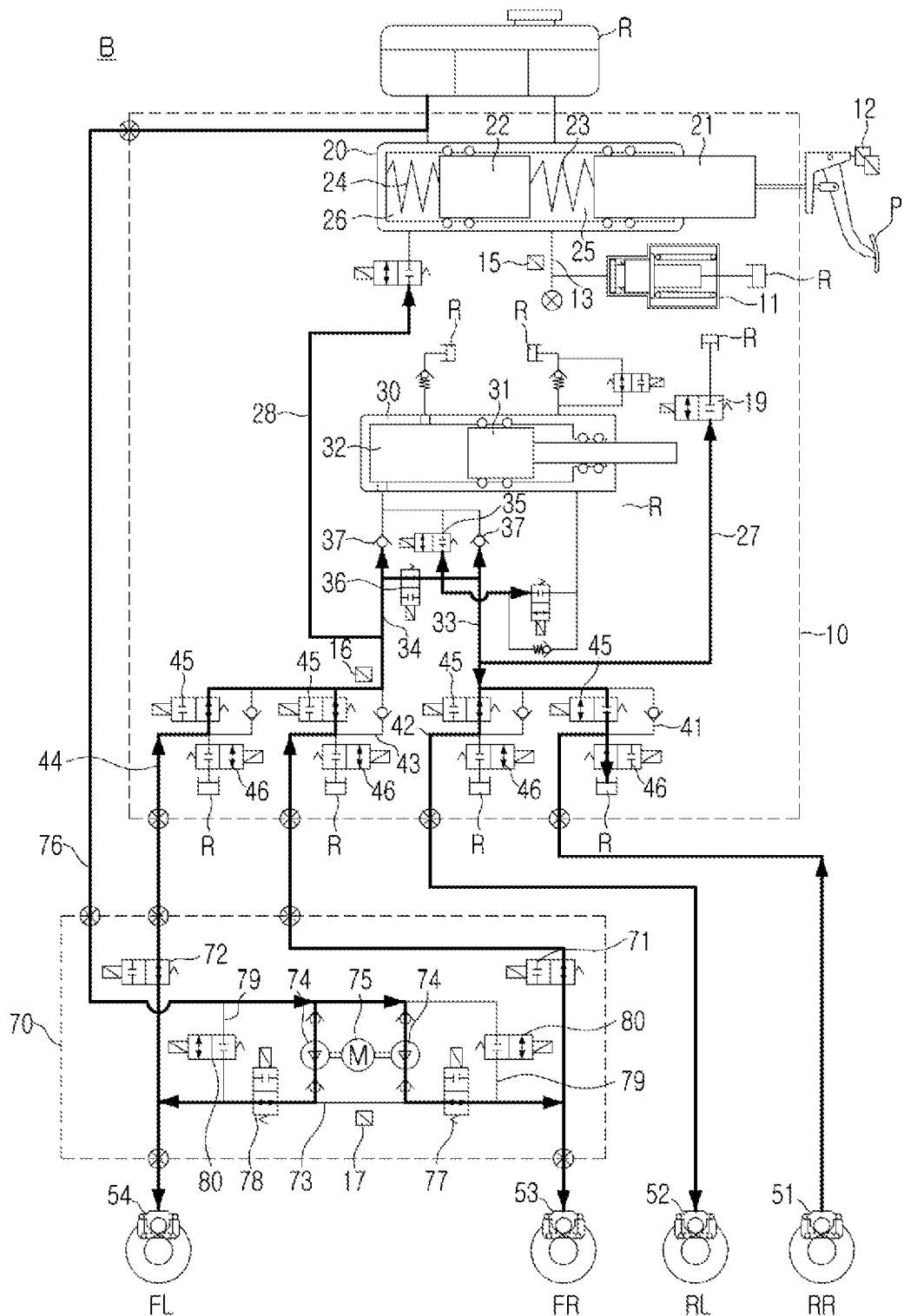

A hydraulic circuit diagram when the selective braking mode is executed through the cooperative control of the main braking controller 10 and the backup braking controller 10 is illustrated in FIG. 7.

The executing the selective braking mode (S49) may include confirming whether or not the selective braking mode has been executed through the cooperative control, by the main braking controller 10 (S34); operating a valve for the cooperative control of the main braking controller 10 (S35) when it is determined that the selective braking mode is being executed; and transmitting operation information of the main braking controller 10 to the backup braking controller 70 (S36).

In the confirming whether or not the selective braking mode has been executed (S34), it may be determined that the selective braking mode is being executed based on dump request information received from the ECU of the backup braking controller 70.

For the cooperative control of the main braking controller 10, the wheel inlet valve 45 and the wheel outlet valve 46 on any one of the first and second hydraulic pressure branch lines 41 and 44 connected to the wheel cylinders of the wheels for which the dump is required in the first hydraulic pressure supply line 33 may be operated according to the control signal of the ECU.

More specifically, first, the hydraulic pressure pumped by the pump 74 from the reservoir R is transferred to the wheel cylinders 53 and 54 each provided in the front right wheel FR and the front left wheel FL through the connection line 73, such that the braking of the front wheels may be maintained.

In addition, the hydraulic pressure pumped by the pump 74 from the reservoir R flows to the third hydraulic pressure branch line 43 and the fourth hydraulic pressure branch line 44 through the connection line 73, is transferred from the second hydraulic pressure supply line 34 to the first hydraulic pressure supply line 33 through the balancing valve 36, branches and flows into the first and second hydraulic pressure branch lines 41 and 44, and is then transferred to the wheel cylinders 51 and 52 each provided in the rear light wheel RR and the rear left wheel RL, such that the braking of the rear wheels may be maintained.

In this state, the wheel inlet valve 45 on any one of the first and second hydraulic pressure branch lines 41 and 44 of the first hydraulic pressure supply line 33 becomes a closed state and the wheel outlet valve 46 on any one of the first and second hydraulic pressure branch lines 41 and 44 of the first hydraulic pressure supply line 33 becomes an opened state, such that the hydraulic oil existing on the corresponding hydraulic pressure branch line is transferred toward the reservoir R through the wheel outlet valve.

Accordingly, the hydraulic pressure is released from the wheel cylinder of the wheel for which the dump is required, such that a braking force of the corresponding wheel is decreased.

The operation information of the main braking controller 10 may include information on the hydraulic pressure sensed by the second pressure sensor 16 and operation duty value information of the wheel outlet valve 46. The ECU of the main braking controller 10 may transmit the operation information to the ECU of the backup braking controller 70 through the communication link 9.

As described above, with the method of operating a brake redundancy device according to an exemplary embodiment of the present disclosure, braking safety of the autonomous vehicle may be further improved without a significant change in cost and weight by changing only a control logic without adding a component.

In addition, according to an exemplary embodiment of the present disclosure, the backup braking controller 70 may perform the four-wheel braking or the all-wheel braking at the time of a failure of the main braking controller 10, such that the NVH reduction performance and the behavioral stability of the vehicle may be maximized, and various additional functions may be implemented.

The spirit of the present disclosure has been illustratively described hereinabove, and those skilled in the art to which the present disclosure pertains may make various modifications and alterations without departing from the essential characteristics of the present disclosure.

Therefore, exemplary embodiments disclosed in the present specification and the drawings are not to limit the spirit of the present disclosure, but are to describe the present disclosure, and the spirit and scope of the present disclosure are not limited to these exemplary embodiments. The scope of the present disclosure is to be interpreted by the following claims, and it is to be interpreted that all the spirits equivalent to the following claims fall within the scope of the present disclosure.

What is claimed is:

1. A method of operating a brake redundancy device including a main braking controller performing braking by providing a hydraulic pressure to wheel cylinders mounted on a plurality of wheels of a vehicle and a backup braking controller performing braking on behalf of the main braking controller in a redundancy situation, comprising:
   confirming whether or not a command signal for deceleration of the vehicle has been received, by the backup braking controller;
   executing a front-wheel braking mode by the backup braking controller when the command signal has been received;
   determining, by the backup braking controller, whether or not an allowable condition for providing the hydraulic pressure to wheel cylinders of rear wheels has been satisfied; and
   executing a rear-wheel braking mode through a cooperative control of the main braking controller and the backup braking controller when the allowable condition has been satisfied,
   wherein the executing of the rear-wheel braking mode includes:
   opening a flow passage between the backup braking controller and the main braking controller; and
   transmitting operation information of the backup braking controller to the main braking controller, and
   wherein in the executing of the rear-wheel braking mode, the hydraulic pressure is provided from the backup braking controller to a portion of the main braking controller.

2. The method of claim 1, further comprising a failure determining step of monitoring and determining failures of components by each of the main braking controller and the backup braking controller.

3. The method of claim 2, wherein the failure determining step includes:
   monitoring and determining a failure of a hydraulic pressure supply unit by the main braking controller;
   transmitting a failure signal to the backup braking controller when it is determined that the failure of the hydraulic pressure supply unit has occurred;
   confirming whether or not the failure signal of the hydraulic pressure supply unit has been received from the main braking controller by the backup braking controller;
   determining a failure of the backup braking controller when the failure signal of the hydraulic pressure supply unit has been received; and
   entering into the cooperative control of the main braking controller and the backup braking controller when there is no failure of the backup braking controller.

4. The method of claim 3, wherein the failure determining step further includes, before the monitoring and determining of the failure of the hydraulic pressure supply unit, monitoring and determining failures of components other than the hydraulic pressure supply unit by the main braking controller, and
when there are no failures of the components other than the hydraulic pressure supply unit, the monitoring and determining of the failure of the hydraulic pressure supply unit is performed.

5. The method of claim 3, wherein the failure determining step further includes, before the confirming whether or not the failure signal of the hydraulic pressure supply unit has been received, determining whether or not a failure of communication has occurred, by the backup braking controller.

6. The method of claim 3, wherein in the determining of the failure of the backup braking controller, when it is determined that a failure of at least one of the components of the backup braking controller has occurred, the method ends.

7. The method of claim 1, wherein the allowable condition includes a condition in which a value of a hydraulic pressure sensed by a pressure sensor of the backup braking controller is equal to a predetermined reference value or more, or a condition in which an amount of required longitudinal deceleration/acceleration of the vehicle calculated by an autonomous driving controller of the vehicle is equal to a predetermined reference value or more.

8. The method of claim 1, wherein the executing of the rear-wheel braking mode includes:
confirming whether or not the rear-wheel braking mode has been executed through the cooperative control, by the main braking controller;
operating a valve for the cooperative control of the main braking controller when it is determined that the rear-wheel braking mode is being executed; and
transmitting operation information of the main braking controller to the backup braking controller.

9. The method of claim 8, wherein in the confirming whether or not the rear-wheel braking mode has been executed, it is determined that the rear-wheel braking mode is being executed based on the operation information received from the backup braking controller.

10. The method of claim 8, wherein in the operating of the valve, a balancing valve between a first hydraulic pressure supply line on a rear wheel side and a second hydraulic pressure supply line on a front wheel side is switched to an opened state, and
in a state in which braking of front wheels is maintained, a hydraulic pressure input from the backup braking controller is supplied from the second hydraulic pressure supply line of the main braking controller to the first hydraulic pressure supply line.

11. The method of claim 1, further comprising executing a selective braking mode of imparting a difference in braking force between left and right rear wheels through the cooperative control of the main braking controller and the backup braking controller for vehicle stability control.

12. The method of claim 11, wherein the selective braking mode includes:
determining whether or not the selective braking mode is required;
determining whether or not a dump for dumping the hydraulic pressure is required when it is determined that the selective braking mode is required; and
executing the selective braking mode through the cooperative control of the main braking controller and the backup braking controller when the dump is required.

13. The method of claim 12, wherein in the determining of whether or not the dump for dumping the hydraulic pressure is required, when the dump is not required, a hold state of constantly holding the hydraulic pressure is executed, such that the front-wheel braking mode and the rear-wheel braking mode are maintained.

14. The method of claim 12, wherein the executing the selective braking mode includes:
confirming whether or not the selective braking mode has been executed through the cooperative control, by the main braking controller;
operating a valve for the cooperative control of the main braking controller when it is determined that the selective braking mode is being executed; and
transmitting operation information of the main braking controller to the backup braking controller.

15. The method of claim 14, wherein in the confirming whether or not the selective braking mode has been executed, it is determined that the selective braking mode is being executed based on dump request information received from the backup braking controller.

16. The method of claim 14, wherein in the operating of the valve, a wheel inlet valve on any one of first and second hydraulic pressure branch lines connected to wheel cylinders of wheels for which the dump is required in a first hydraulic pressure supply line on a rear wheel side is switched to a closed state, and a wheel outlet valve on any one of the first and second hydraulic pressure branch lines is switched to an opened state, and
in a state in which braking of a front wheel and braking of the other rear wheel are maintained, hydraulic oil existing in any one hydraulic pressure branch line is transferred to a reservoir through the wheel outlet valve.

* * * * *